United States Patent Office 2,800,341
Patented July 23, 1957

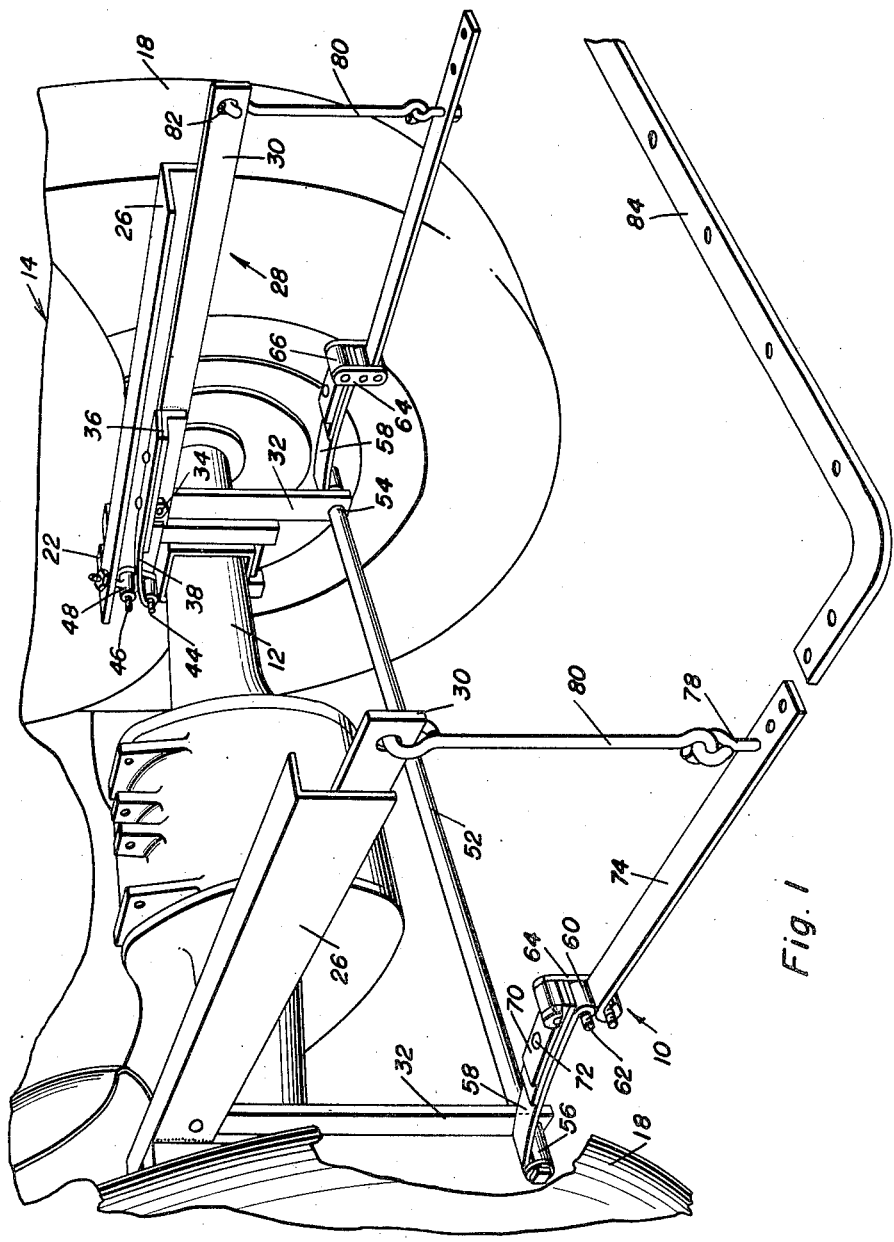
Fig. I
Harry Gaines, Jr.
INVENTOR.
BY
Attorneys

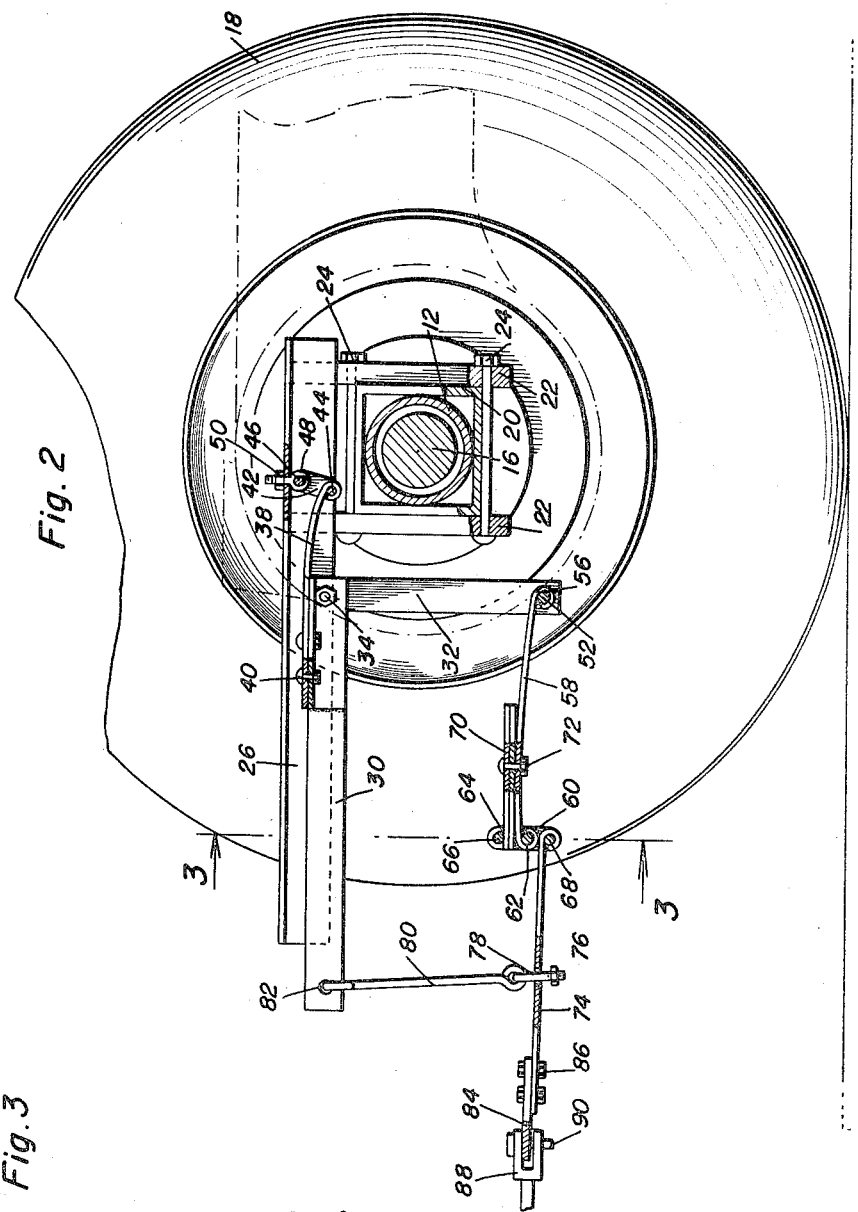
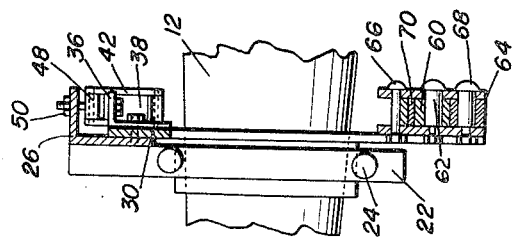
Harry Gaines, Jr.
INVENTOR.

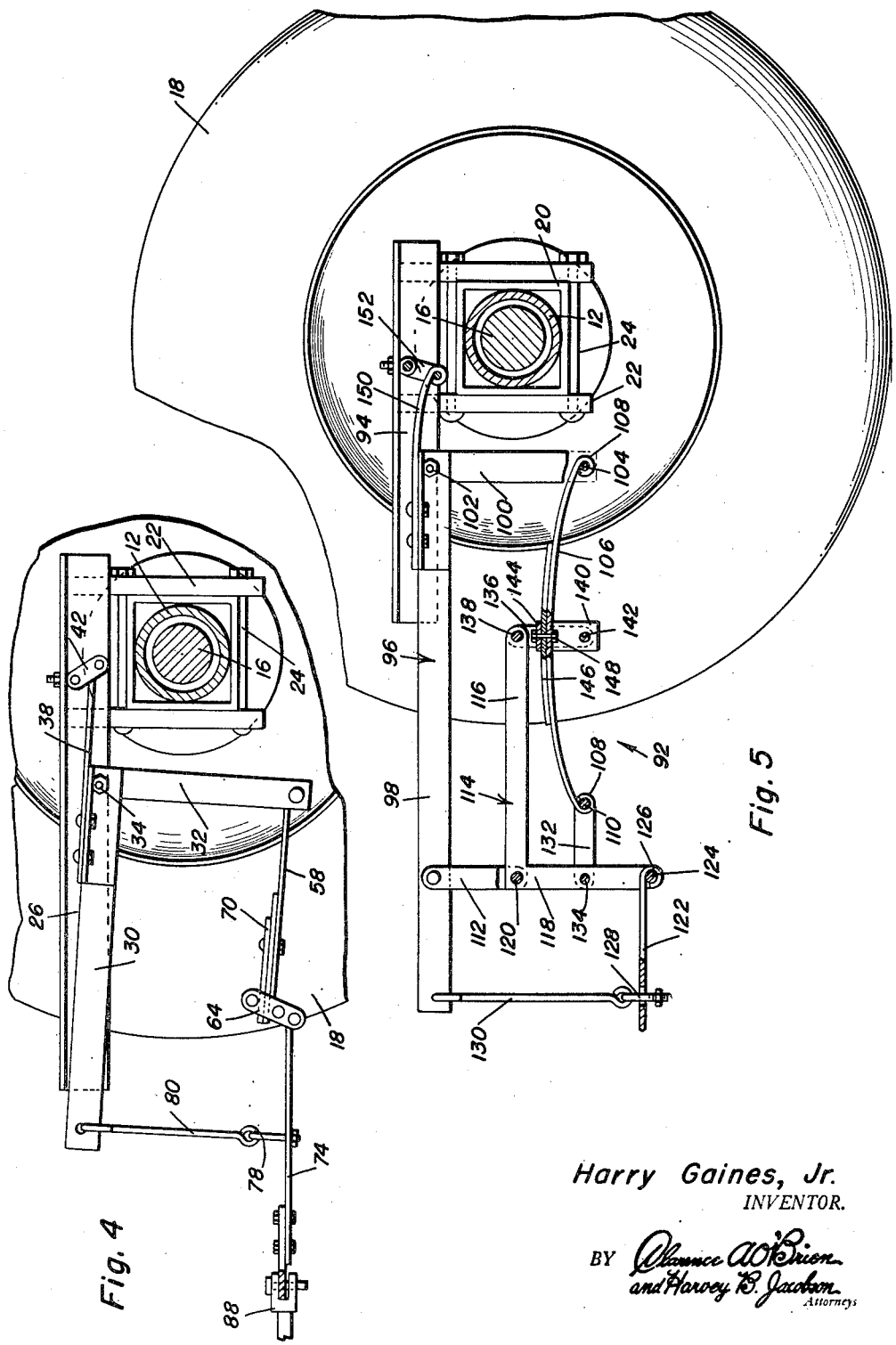

---

2,800,341

DRAWBAR ASSEMBLY CONSTRUCTED SO AS TO INCREASE TOWING VEHICLE TRACTION

Harry Gaines, Jr., Clovis, N. Mex.

Application October 19, 1954, Serial No. 463,161

8 Claims. (Cl. 280—489)

This invention relates to a drawbar assembly in general and more specifically provides improved and novel construction in drawbar assemblies and forms a continuation in part of my co-pending application Serial No. 378,239 filed September 3, 1953, now Patent 2,702,198.

An object of this invention is to provide a drawbar assembly for attachment to the rear portion of a tractor for conveniently attaching various implements thereon wherein the force exerted for pulling the implements will have a portion thereof converted to a downward force on the traction wheels of the tractor thereby affording such traction wheels with a further traction grip for more efficiently pulling the implements.

Another object of this invention is to provide a drawbar assembly having a resilient flat spring associated with a pivotal member wherein the spring will resist pivotal movement of the pivotal member and transfer this resistance into a downward pull on the tractor and the traction wheels thereon.

A further object of this invention is to provide a drawbar assembly that may be secured to conventional existing tractors by an easily attached clamp bracket and which may be utilized for pulling all types of implements.

Other important objects of the present invention will be found in its simplicity of construction, ruggedness, its ease of attachment, its adaptability for its purposes and its relatively inexpensive manufacture.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view showing the drawbar assembly of this invention secured to the rear axle housing of a tractor;

Figure 2 is generally an elevational sectional view taken along a longitudinal line of the tractor showing portions of one side of the drawbar assembly of the present invention with parts broken away showing the details of construction thereof;

Figure 3 is a vertical, sectional view taken substantially upon a plane passing along section line 3—3 of Figure 2 showing the details of construction of the offset linkage mechanism and other structural details of the present invention;

Figure 4 is a view similar to Figure 2 showing the drawbar assembly of the present invention in the position normally assumed when the tractor is pulling an implement wherein a portion of the horizontal pull has been transmitted to a vertical downward force on the traction wheels;

Figure 5 is a sectional view similar to Figure 3 showing a modified form of the drawbar assembly of the present invention with portions thereof being broken away to show the details of construction thereof.

Referring now specifically to the drawings, it will be seen that the numeral 10 generally indicates the drawbar assembly of the present invention for attachment to the rear axle housing 12 of a tractor generally indicated by the numeral 14. The rear axle 12 is provided with the usual axle 16 therein having ground engaging driving or traction wheels 18 on the outer ends thereof.

A polygonal adapter 20 is positioned around the axle housing 12 for receiving a pair of vertically extending clamp members 22 having upper and lower clamp bolts 24 extending therethrough wherein the clamp bolts 24 engage the upper and lower edges of the adapter 20 and form supporting brackets for the drawbar assembly 10 wherein the draw bar assembly 10 is securely fastened to the rear axle housing 12 of the tractor 14.

Secured to the upper ends of the members 22 are rearwardly extending members 26. It will be seen that the rearwardly extending members 26 are generally horizontal and are secured to the upper ends of each pair of clamp members 22 by suitable welding or other fastening means. The particular length of the rearwardly extending members 26 is optional as is the specific shape although for purposes of illustration, the rearwardly extending members 26 are shown as angle irons.

Secured to each of the rearwardly extending members 26 is an L-shaped member generally indicated by the numeral 28 and including a horizontal leg 30 and a vertical leg 32 pivotally secured to the rearwardly extending member 26 by a pivot bolt 34 positioned at the junction between the horizontal leg 30 and the vertical leg 32. The vertical leg 32 is at the forwardmost end of the horizontal leg 30 and is pivoted to the rearwardly extending member 26 in spaced relation to the clamping members 22. On the inner surface of the horizontal leg 30 adjacent the vertical leg 32 is an angle iron member 36 which terminates at the forward edge of the vertical leg 32. Projecting forwardly of the angle line member 36 is a generally downwardly curved flat spring member 38 secured to the angle iron member 36 by fastening bolt 40. The forward end of the spring 38 is pivotally connected to a pair of link members 42 by a transverse pin 44 extending between the link members 42 at the lower end thereof. The upper ends of the link members 42 are connected by a transverse pin 46 having an eye bolt 48 positioned therein and extending through the rearwardly extending member 26 and secured thereto by fastening nut 50 thereby pivotally joining the forward end of the spring 38 to the rearwardly extending member 26 for swinging pivotal movement.

Extending between the lower ends of the vertical legs of the L-shaped members 28 is an elongated transverse rod 52 that is pivotally mounted in apertures 54 in the bottom of the vertical legs 32. The transverse bar or rod extends beyond the vertical legs 32 for pivotally receiving the loop end 56 of a flat spring member 58 wherein the flat spring member may pivot in relation to the vertical legs 32 of the L-shaped members 28.

The rearward end of the spring member 58 terminates in a loop 60 that is positioned over a transverse pin 62 extending centrally between two links 64. The upper end of the links 64 are connected by a transverse pin 66 and the lower ends of the links 64 are connected by a lower transverse pin 68 with the central transverse pin 62 being positioned therebetween. Securely fastened to the upper surface of the rearwardly extending spring 58 is a pair of flat spring members 70 secured thereto by a bolt 72 wherein the flat spring members 70 extend between the upper surface of the spring 58 and the upper transverse pin wherein pivotal movement of the links 64 will cause the transverse pin 66 to push downwardly on the springs 70 and the spring 58. Pivotally connected to the transverse pin 68 is a rearwardly extending member 74 having an aperture 76 positioned centrally therein for receiving an eye bolt 78. A connecting eye member 80 connects the eye bolt 78 to an aperture 82 in the rear end of the horizontal leg 30 of the L-shaped members 28 thereby forming a partial support for the rearwardly extending connecting member 74. The rear end of the connecting member 74 is connected to a transverse draw bar 84 by fastening bolts 86 wherein a suitable clevis 88 and pins 90 may be utilized for fastening an implement to the drawbar 84. It is noted that the supporting member 80 permits limited pivotal movement of the member 74 and also permits limited vertical swinging movement of the drawbar 84 so that the force on the drawbar 84 is substantially a completely horizontal force. From the normal position shown in Figure 2, the draw bar assembly 10 moves to the position shown in Figure 4 when a force is exerted on the drawbar 84. When this occurs, the force is transmitted through the offset linkage made up of the two links 64 and the transverse pins 62, 66 and 68 wherein the spring member 68 is urged downwardly as well as pulled rearwardly. When the lower end of the vertical leg 32 is pulled rearwardly, the L-shaped member 28 pivots about pivot pin 34 thereby urging the spring 38 downwardly and transmitting a portion of the horizontal pull on the drawbar 84 to a vertical downward force on the axle housing 12 and the traction wheels 18 thereby increasing the traction grip of the traction wheels 18.

Referring now specifically to Figure 5, it will be seen that the numeral 92 generally indicates a modified form of the drawbar assembly of the present invention. In this case, the details of the traction wheel 18, tractor axle housing 12, tractor axle 16, clamping members 22, clamping bolts 24 and adapter 20 are identical to these elements as illustrated in Figures 1–4. In this case, a rearwardly extending member 94 is integrally formed with the upper end of the clamping members 22 which is substantially similar in construction to the rearwardly extending member 26 in Figures 1–4 except it is illustrated as being shorter in construction.

Pivotally secured to the rearwardly extending members 94 is an L-shaped member generally indicated by the numeral 96 having a horizontal leg 98 and a vertical leg 100. The L-shaped member 96 is pivoted to the rearwardly extending member 94 by pivot bolt 102. At the lower end of the vertical leg 100 is a transverse bar 104 pivotally receiving an elongated arched spring member 106 having loop ends 108 at each end for positioning over the transverse rod 104 at one end and over a pin 110 at the other end. Pivotally secured and depending from the horizontal leg 98 of the L-shaped member 96 is a depending bracket 112 for pivotally supporting a right angular member generally indicated by the numeral 114 and including a horizontal leg 116 and a vertical leg 118 with the horizontal leg 116 extending forwardly of the vertical leg 118. The right angle member 114 is pivotally secured to the bracket 112 by pivot pin 120 and the lower end of the vertical leg 118 is pivotally secured to a rearwardly extending attaching member 122 by pivot pin 124 extending through a loop 126 on the forward end of the attaching member 122. The member 122 extends rearwardly and is provided with a drawbar (not shown) which interconnects the rear ends thereof wherein a similar structure as shown in Figure 5 is provided adjacent each end of the tractor axle housing 12. The rearwardly extending member 122 is provided with an eye bolt 128 and a supporting length 130 which interconnects the attaching member 122 and the rear end of the horizontal leg 98 of the L-shaped member 96 thereby forming a support for the member 122 but permitting limited pivotal movement thereof wherein a horizontal force will be exerted by the member 122 to the right angle member 114. Adjacent the mid-point of the vertical leg 118 of the right angle member 114 is a pair of link members 132 connected to the vertical leg 118 by transverse pin 134 and connected to the eye 108 at the rear of the spring member 106 by the transverse pin member 110. The forward end of the horizontal leg 116 of the right angle member 114 is pivotally connected to a pair of links 136 by a transverse pin 138. The links 136 extend downwardly below the spring 106 and are connected to a pair of bracket members 140 by a transverse pin 142. The members 140 are depending legs of a generally U-shaped bracket 144 which extends over the spring member 106 and a second spring member 146 positioned thereon. The spring members 106, 146 and the U-shaped bracket 144 are secured together in assembled relation by a fastening bolt 148 thereby forming a complete assembly for transmitting a portion of the horizontal pull on the member 122 to the tractor axle housing 12 as a downward force thereby increasing the traction of the traction wheel 18. Normally, the horizontal force on the member 122 tends to pivot the right angular member 114 about pivot pin 120. This tends to push down on the center portion of the springs 106 and 146 due to the transmittal of motion through the right angle member 114 to the bracket 140. The links 132 also transmit a horizontal pull to the spring 106 wherein the spring 106 will transmit a rearward horizontal pull on the lower end of the vertical leg 100 and also a downward pull thereon thereby pivoting the L-shaped member 96 about pivot pin 102 thereby transmitting substantially a large amount of the horizontal force to the horizontal member 94 as a vertical downward force by utilizing a flat spring 150 and links 152 which are substantially equal to the links 42 and the spring 38 illustrated in Figures 1–4 and in exactly the same manner.

In each instance, a portion of the horizontal force exerted on the drawbar for pulling a suitable implement transmitted through the drawbar assembly 10 or 92 as a vertical downward force on the traction wheels 18 for increasing the traction grip of the driving or traction wheels 18.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A drawer assembly for attachment to the rear of a tractor comprising a supporting bracket adapted to be attached to the tractor, a rearwardly extending member on said bracket, an L-shaped member pivotally attached to said rearwardly extending member, said L-shaped member including a generally horizontal leg and a generally vertical leg with the vertical leg depending from the rearwardly extending member, a rearwardly extending attaching member pivotally connected to the lower end of the vertical leg of the L-shaped member, and resilient spring means interconnecting the rearwardly extending member and the L-shaped member in generally forwardly, horizontally spaced relation to the pivotal connection therebetween for exerting a vertical force on the rearwardly extending member when a horizontal pull is exerted on the rearwardly extending attaching member.

2. A drawbar assembly for attachment to the rear axle housing of a tractor comprising a pair of supporting brackets adapted to be attached to the rear axle housing, a rearwardly extending member attached to each bracket, an L-shaped member pivotally secured to each rearwardly extending member, each of said L-shaped members including a generally horizontal leg and a generally vertical depending leg, resilient means interconnecting said extending members and said L-shaped members in forwardly spaced relation to the pivotal connections therebetween, a rearwardly extending attaching means pivotally secured to the lower end of the vertical leg of each L-shaped member, a drawbar secured to and extending between the rearwardly extending attaching means wherein a horizontal pull exerted on the drawbar will pivot the L-shaped members and transmit a vertical pull to the extending members through the resilient means, said resilient means resisting the pivotal movement of the L-shaped members by exerting a downward force on the extending members thereby increasing the traction of the tractor.

3. A drawbar assembly for attachment to the rear axle housing of a tractor comprising a pair of supporting brackets adapted to be attached to the rear axle housing, a rearwardly extending member attached to each bracket, an L-shaped member pivotally secured to each rearwardly extending member, each of said L-shaped members including a generally horizontal leg and a generally vertical depending leg, resilient means interconnecting said extending members and said L-shaped members in spaced relation to the pivotal connections therebetween, a rearwardly extending attaching means pivotally secured to the lower end of the vertical leg of each L-shaped member, a drawbar secured to and extending between the rearwardly extending attaching means wherein a horizontal pull exerted on the drawbar will pivot the L-shaped members and transmit a vertical pull to the extending members through the resilient means, said resilient means resisting the pivotal movement of the L-shaped members by exerting a downward force on the extending members thereby increasing the traction of the tractor, said resilient means including a flat spring extending forwardly of the pivotal connection between each L-shaped member and extending member, said springs being rigidly connected to the L-shaped members and connected to the extending members by a connecting link.

4. A drawbar assembly for attachment to the rear axle housing of a tractor comprising a pair of supporting brackets adapted to be attached to the rear axle housing, a rearwardly extending member attached to each bracket, an L-shaped member pivotally secured to each rearwardly extending member, each of said L-shaped members including a generally horizontal leg and a generally vertical depending leg, resilient means interconnecting said extending members and said L-shaped members in forwardly spaced relation to the pivotal connections therebetween, a rearwardly extending attaching means pivotally secured to the lower end of the vertical leg of each L-shaped member, a drawbar secured to and extending between the rearwardly extending attaching means wherein a horizontal pull exerted on the drawbar will pivot the L-shaped members and transmit a vertical pull to the extending members through the resilient means, said resilient means resisting the pivotal movement of the L-shaped members by exerting a downward force on the extending members thereby increasing the traction of the tractor, said L-shaped members being pivotally connected to the extending members at the juncture of the horizontal and vertical legs.

5. A drawbar assembly for attachment to the rear axle housing of a tractor comprising a pair of supporting brackets adapted to be attached to the rear axle housing, a rearwardly extending member attached to each bracket, an L-shaped member pivotally secured to each rearwardly extending member, each of said L-shaped members including a generally horizontal leg and a generally vertical depending leg, resilient means interconnecting said extending members and said L-shaped members in forwardly spaced relation to the pivotal connections therebetween, a rearwardly extending attaching means pivotally secured to the lower end of the vertical leg of each L-shaped member, a drawbar secured to and extending between the rearwardly extending attaching means wherein a horizontal pull exerted on the drawbar will pivot the L-shaped members and transmit a vertical pull to the extending members through the resilient means, said resilient means resisting the pivotal movement of the L-shaped members by exerting a downward force on the extending members thereby increasing the traction of the tractor, and means flexibly interconnecting the rearwardly extending attaching means and the horizontal leg of the L-shaped members for retaining the rearwardly extending attaching means in a normal horizontal position, said flexible means permitting limited movement of said attaching means.

6. A drawbar assembly for attachment to the rear axle housing of a tractor comprising a pair of supporting brackets adapted to be attached to the rear axle housing, a rearwardly extending member attached to each bracket, an L-shaped member pivotally secured to each rearwardly extending member, each of said L-shaped members including a generally horizontal leg and a generally vertical depending leg, resilient means interconnecting said extending members and said L-shaped members in forwardly spaced relation to the pivotal connections therebetween, a rearwardly extending attaching means pivotally secured to the lower end of the vertical leg of each L-shaped member, a drawbar secured to and extending between the rearwardly extending attaching means wherein a horizontal pull exerted on the drawbar will pivot the L-shaped members and transmit a vertical pull to the rearwardly extending members through the resilient means, said resilient means resisting the pivotal movement of the L-shaped members by exerting a downward force on the rearwardly extending members thereby increasing the traction of the tractor, each of said attaching means including a rearwardly extending spring member, and a connecting member attached thereto by an offset linkage for transmitting a portion of a horizontal pull on the connecting member to a downward pull on the lower end of the L-shaped members, said drawbar being secured to and between said connecting member portions of said rearwardly extending attaching means and below the connections between these portions and the rearwardly extending spring members.

7. A drawbar assembly for attachment to the rear axle housing of a tractor comprising a pair of supporting brackets adapted to be attached to the rear axle housing, a rearwardly extending member attached to each bracket, an L-shaped member pivotally secured to each rearwardly extending member, each of said L-shaped members including a generally horizontal leg and a generally vertical depending leg, resilient means interconnecting said extending members and said L-shaped members in forwardly spaced relation to the pivotal connections therebetween, a rearwardly extending attaching means pivotally secured to the lower end of the vertical leg of each L-shaped member, a drawbar secured to and extending between the rearwardly extending attaching means wherein a horizontal pull exerted on the drawbar will pivot the L-shaped members and transmit a vertical pull to the extending members through the resilient means, said resilient means resisting the pivotal movement of the L-shaped members by exerting a downward force on the extending members thereby increasing the traction of the tractor, each of said rearwardly extending attaching means including a rearwardly extending spring member and a connecting member attached thereto by an offset linkage for transmitting a portion of a horizontal pull on the connecting member to a downward pull on the lower end of the L-shaped members, said drawbar being secured to and between said connecting member portions of siad rearwardly extending attaching means and below the connections between these portions and the rearwardly extending spring members, said spring member including an elongated flat spring, and said offset linkage including a pair of links for urging the spring downwardly.

8. A drawbar assembly for attachment to the rear axle housing of a tractor comprising a pair of supporting brackets adapted to be attached to the rear axle housing, a rearwardly extending member attached to each bracket, an L-shaped member pivotally secured to each rearwardly extending member, each of said L- shaped members including a generally horizontal leg and a generally vertical depending leg, resilient means interconnecting said extending members and said L-shaped members in forwardly spaced relation to the pivotal connections therebetween, a rearwardly extending attaching means pivotally secured to the lower end of the vertical leg of each L-shaped member, a drawbar secured to and extending between the rearwardly extending attaching means wherein a horizontal pull exerted on the drawbar will pivot the L-shaped members and transmit a vertical pull to the extending members through the resilient means, said resilient means resisting the pivotal movement of the L-shaped members by exerting a downward force on the extending members thereby increasing the traction of the tractor, each of said rearwardly extending attaching means including a rearwardly extending spring member, and a connecting member attached thereto by an offset linkage for transmitting a portion of a horizontal pull on the connecting members to a downward pull on the lower end of the vertical legs of the L-shaped members, said drawbar being secured to and between said connecting member portions of said rearwardly extending attaching means and below the connections between these portions and the rearwardly extending spring members, each of said connecting members including a right angular member having a vertical and horizontal leg with the junction thereof pivotally attached to a bracket depending from the L-shaped member, said rearwardly extending spring members extending from the vertical legs of the L-shaped members towards the vertical legs of the right angular members, links interconnecting the rear ends of the rearwardly extending spring members and the vertical legs of the right angular members, said horizontal legs of the right angular members engaging the central upper surface of the spring member for urging downwardly thereon for urging the tractor axle downwardly.

References Cited in the file of this patent
UNITED STATES PATENTS

| | | |
|---|---|---|
| 1,877,126 | Greer | Sept. 13, 1932 |
| 2,540,677 | Kandt et al. | Feb. 6, 1951 |
| 2,551,870 | Bridges | May 8, 1951 |

FOREIGN PATENTS

| | | |
|---|---|---|
| 653,754 | Great Britain | May 23, 1951 |